March 14, 1961 L. C. LUDBROOK 2,975,346
WINDING AND HAULAGE EQUIPMENT
Filed March 27, 1958 2 Sheets-Sheet 1

INVENTOR
LESLIE CARTER LUDBROOK
ATTORNEY

March 14, 1961

L. C. LUDBROOK 2,975,346

WINDING AND HAULAGE EQUIPMENT

Filed March 27, 1958

2 Sheets-Sheet 2

INVENTOR
LESLIE CARTER LUDBROOK

ATTORNEY

United States Patent Office 2,975,346
Patented Mar. 14, 1961

2,975,346
WINDING AND HAULAGE EQUIPMENT

Leslie Carter Ludbrook, Cawston, near Rugby, England, assignor to The British Thomson-Houston Company Limited, London, England, a British company Filed Mar. 27, 1958, Ser. No. 724,336

Claims priority, application Great Britain Mar. 28, 1957

5 Claims. (Cl. 318—169)

This invention relates to winding and haulage equipment.

In equipment of this nature it is sometimes necessary to make provision for the load to fall rapidly under gravity but at the same time both to limit the maximum speed at which it falls and also to reduce the speed as the end of the travel is approached to avoid damage.

A particular case in which this arises is in equipment for raising and lowering the control rods of a nuclear reactor. In such equipment it is necessary to allow all the rods to fall rapidly under emergency conditions known as scram, and to reduce their speed to a safe value before impact.

It is known to control the speed of an electrical winder motor and to effect dynamic braking by variable resistances.

However, known arrangements have involved a two circuit electrical motor, that is a wound rotor type induction motor with supply on to the stator and provision for inserting resistance in the rotor circuit and this in many cases is undesirable inasmuch as it involves slip rings.

In particular such arrangements are unsuitable in nuclear reactors as moving parts are most undesirable.

The main object of the invention is to provide an improved arrangement which avoids the need for connections to the rotor and has free moving parts.

According to the present invention a dynamic braking system for winding and haulage equipment comprises an electric motor having a permanent magnet rotor and a polyphase stator winding, a first set of resistances connected permanently across said stator windings and means for successively connecting additional sets of resistances across said stator windings to provide additional braking when the load approaches the downward end of its travel.

Figure 1:
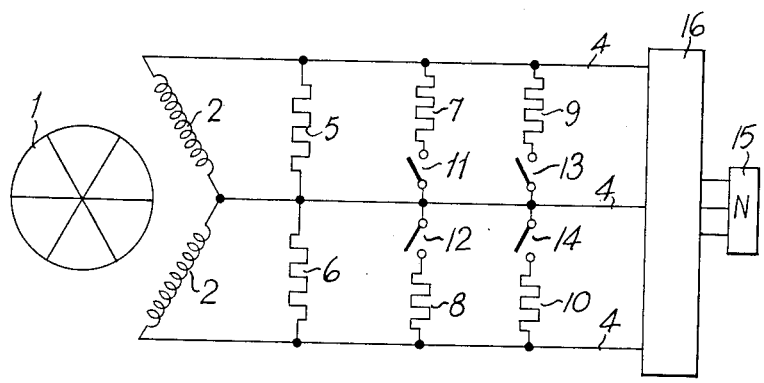
Figure 2:
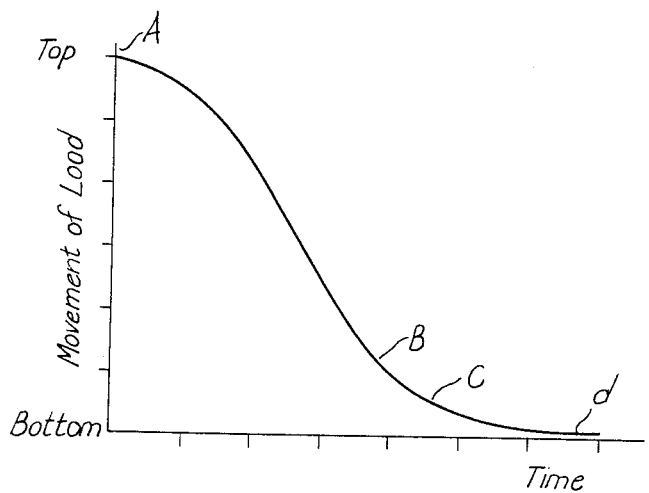

The invention is now described with reference to the accompanying drawings, in which:

Fig. 1 is a diagram of the circuit showing the braking resistances and switches; and Fig. 2 is a graph of a typical deceleration curve for a load.

Figure 3:
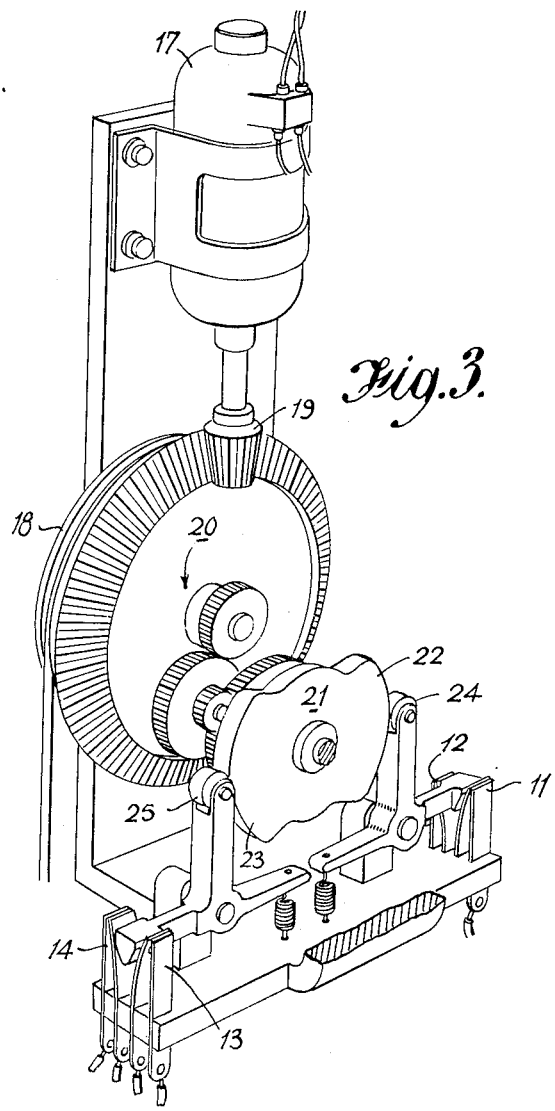

Reference is also made to the accompanying drawing in which:

Fig. 3 shows mechanism driven by the rotor shaft for operating switches.

Fig. 1 shows a motor with permanent magnet rotor 1 and two-phase stator windings 2 and 3. During normal running the stator winding leads 4 are fed with low frequency A.C. from a source 15 through a control switch indicated at 16. Braking resistances 5 and 6 are connected permanently across the stator phase windings as shown. 7, 8, 9 and 10 are further braking resistances which are connected into the circuit by the closing of switches 11, 12, 13 and 14 respectively.

Fig. 2 shows a typical deceleration curve for a load falling under gravity with three stages of controlling braking. Between point A and B the load falls with a first degree of braking. Between points B and C the load falls with a second degree of braking. Between points C and D the load falls with a third degree of braking sufficient to reduce its speed to the maximum permissible at the end of its travel.

Fig. 3 shows apparatus which could be atached to the winding motor shaft in order to operate the switches 11, 12, 13 and 14 when the load has reached predetermined points in its downward travel.

The winding motor 17 drives a winding drum 18 through a bevel drive 19. The winding drum 18 is also coupled through a gear train 20 with a double cam 21. The cam 21 has two cam surfaces 22 and 23 which operate on two cam followers 24 and 25 respectively. These cam followers are pivotally mounted and the follower 24 actuates double pole switches 11, 12, whilst follower 25 actuates switches 13 and 14. These switches corerspond to the switches shown in Fig. 1.

The cam surfaces 28 and 29 are so designed and are so positioned on the cross shaft 26 that the switches are operated when the load being lowered by the motor 21 is in the required position. Additional braking is thereby provided by the insertion of the resistances into the stator circuit and the speed of movement of the load can thereby be kept within safe limits.

The operation of the apparatus is as follows:

Normal winding in either direction is carried out by connecting the electrical supply to the motor stator phase windings in the appropriate sense according to the direction of wind. Under conditions of emergency the supply is disconnected and the load, e.g. control rod, allowed to fall freely.

Initially i.e. at point A in Fig. 2, only resistances 5 and 6 are connected in the circuit and the speed of travel rises to a high steady value, depending on the value of 5 and 6 and any external friction effects. When point B is reached switches 11 and 12 are closed by the action of the motor or the load in any manner well known such as that described above, and resistances 7 and 8 are connected into the circuit. The braking effect is therefore increased and the speed drops accordingly as shown in Fig. 2. When point C is reached the switches 13 and 14 are closed, also by the action of the motor or the load, and resistances 9 and 10 are connected into the circuit. This reduces the speed even further and eventually the bottom limit of travel is reached at D at a very low speed. Mechanical braking can in some cases be supplied to bring the load finally to rest.

The motor 1 has been described with a two-phase stator but it can have any number of phase windings in its stator and braking resistances may be connected across each of these windings.

As above mentioned the invention is applicable to the operation of the control rods of nuclear reactors and it will be appreciated that it minimises risk of damage when the control rods are allowed to fall rapidly under scram conditions.

What I claim is:

1. Winding and haulage apparatus for raising and lowering a load comprising an electric winding motor, a permanent magnet rotor to said motor, a polyphase stator winding to said motor, a first set of dynamic braking resistances connected permanently across said stator windings, a second set of dynamic braking resistances, switches adapted to connect said additional dynamic braking resistances across said stator windings and means for actuating said switches in accordance with the position of the load to provide additional braking effort when the load approaches the end of its downward travel.

2. Winding and haulage apparatus for raising and lowering a load comprising an electric winding motor, a permanent magnet rotor to said motor, a polyphase stator winding to said motor, a first set of dynamic braking resistances connected permanently across said stator windings, a second set of dynamic braking resistances, switches adapted to connect said additional dynamic braking resistances across said stator windings and cam means controlled by said winding apparatus and arranged to actuate said switches to connect said additional resistances across the stator windings when the load approaches the end of its downward travel.

3. Winding and haulage apparatus for raising and lowering a load comprising a winding motor, a permanent magnet rotor to said motor, a winding device coupled to said rotor, a polyphase stator winding, means for connecting an electric supply to said stator to effect a wind, a first set of dynamic braking resistances permanently connected across the stator windings, additional dynamic braking resistances and switch means for connecting said additional resistances across said stator windings and means controlled in accordance with the position of the load for actuating said switches to connect said additional resistances across said stator windings when the load approaches the end of its downward travel.

4. Winding and haulage apparatus for raising and lowering a load comprising a winding motor, a permanent magnet rotor to said motor, a winding device coupled to said motor, a polyphase stator winding, means for connecting an electric supply to said stator to effect a wind, a first set of dynamic braking resistances permanently connected across said stator windings, at least two sets of additional braking resistances and switch means actuated in accordance with the position of the load to connect said additional resistances successively across the stator windings when the load approaches the end of its downward travel.

5. In a nuclear reactor winding apparatus for the control rods comprising an electric motor, a permanent magnet rotor to said motor, a cable winder coupled to said rotor, a polyphase stator to said motor, means for connecting an A.C. supply to said stator to effect a wind, a first set of dynamic braking resistances permanently connected across said stator windings, a second set of dynamic braking resistances and means actuated in accordance with the position of the control rods for connecting said additional resistances across the stator windings when the control rods approach the limit of their travel in the downward direction.

References Cited in the file of this patent

UNITED STATES PATENTS

| | | |
|---|---|---|
| 2,098,793 | Pinto | Nov. 9, 1937 |
| 2,510,468 | Fuge | June 6, 1950 |

OTHER REFERENCES

Nuclear Power, vol. 1, November 1956, pp. 282–286.